(12) United States Patent
Roop

(10) Patent No.: US 10,967,952 B2
(45) Date of Patent: Apr. 6, 2021

(54) AIRCRAFT HAND CONTROLLER WITH DECOUPLED THROTTLE

(71) Applicant: Kitty Hawk Corporation, Mountain View, CA (US)

(72) Inventor: Joseph Roop, Sunnyvale, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 196 days.

(21) Appl. No.: 16/379,570

(22) Filed: Apr. 9, 2019

(65) Prior Publication Data

US 2019/0233084 A1    Aug. 1, 2019

Related U.S. Application Data

(63) Continuation of application No. 15/249,076, filed on Aug. 26, 2016, now Pat. No. 10,301,009.

(51) Int. Cl.
*B64C 13/04* (2006.01)
*B64C 27/20* (2006.01)
*B64D 31/04* (2006.01)
*G05G 1/04* (2006.01)
*G05G 9/047* (2006.01)

(52) U.S. Cl.
CPC .......... *B64C 13/04* (2013.01); *B64C 13/0423* (2018.01); *B64C 27/20* (2013.01); *B64D 31/04* (2013.01); *G05G 1/04* (2013.01); *G05G 9/047* (2013.01); *G05G 2009/04774* (2013.01)

(58) Field of Classification Search
CPC ... B64C 13/04; B64C 13/042; B64C 13/0421; B64C 13/0423; B64C 13/0425; B64C 13/0427; B64C 13/12; G05G 1/04; G05G 1/06; G05G 2009/04774; G05G 9/047
See application file for complete search history.

(56) References Cited

U.S. PATENT DOCUMENTS

| | | | |
|---|---|---|---|
| 4,016,775 A | 4/1977 | Carlson | |
| 4,477,043 A | 10/1984 | Repperger | |
| 4,574,651 A | 3/1986 | Nordstroem | |
| 4,896,558 A * | 1/1990 | Meier | E02F 9/2004 |
| | | | 200/522 |
| 5,291,113 A | 3/1994 | Hegg | |
| 5,472,156 A | 12/1995 | Bivens, III | |
| 6,068,554 A | 5/2000 | Tyler | |

(Continued)

FOREIGN PATENT DOCUMENTS

| | | |
|---|---|---|
| CN | 102381470 | 3/2012 |
| CN | 102881849 | 1/2013 |

(Continued)

OTHER PUBLICATIONS https://www.youtube.com/watch?v=2ddOeOcT7YU.

(Continued)

*Primary Examiner* — Philip J Bonzell
*Assistant Examiner* — Tye William Abell
(74) *Attorney, Agent, or Firm* — Van Pelt, Yi & James LLP

(57) ABSTRACT

An aircraft hand controller is disclosed. The hand controller includes a set of finger controls on a single hand grip structure, the set of finger controls including a first finger control configured to control throttle of the aircraft and a second finger control, separate from the first, configured to control rotation about a first rotational axis of the aircraft.

20 Claims, 7 Drawing Sheets

(56) References Cited

U.S. PATENT DOCUMENTS

| | | | |
|---|---|---|---|
| 6,354,023 B1* | 3/2002 | Trahan | E01H 4/02 37/219 |
| 8,082,819 B2 | 12/2011 | Case | |
| 8,844,880 B1 | 9/2014 | Corliss | |
| 2002/0084984 A1 | 7/2002 | Beinor | |
| 2003/0094539 A1 | 5/2003 | Schaeffer | |
| 2005/0279561 A1* | 12/2005 | Shearer | G05G 9/04788 180/333 |
| 2006/0007144 A1* | 1/2006 | Mathiasen | G05G 9/047 345/161 |
| 2006/0053925 A1* | 3/2006 | Merletti | G05G 9/04788 74/471 XY |
| 2006/0229034 A1 | 10/2006 | Gizis | |
| 2006/0274040 A1* | 12/2006 | Passaro | G06F 3/0338 345/161 |
| 2007/0216645 A1* | 9/2007 | Hsu | G06F 3/0338 345/161 |
| 2011/0048162 A1* | 3/2011 | Miura | G05G 1/06 74/523 |
| 2011/0088961 A1* | 4/2011 | Case | E02F 9/2004 180/333 |
| 2014/0091181 A1* | 4/2014 | Ouellette | B64C 13/0427 244/223 |
| 2015/0202540 A1 | 7/2015 | Erhart | |
| 2016/0304181 A1* | 10/2016 | Steven | B63H 25/02 |
| 2018/0095492 A1 | 4/2018 | Matloff | |

FOREIGN PATENT DOCUMENTS

| | | |
|---|---|---|
| CN | 103434642 | 12/2013 |
| EP | 265035 | 4/1988 |

OTHER PUBLICATIONS

Nintendo of American; Starfox64 Instruction Manual, 1997 pp. 6-9.

Spektrum DX9 Instruction Manual, 2013, p. 6.

* cited by examiner

AIRCRAFT HAND CONTROLLER WITH DECOUPLED THROTTLE

CROSS REFERENCE TO OTHER APPLICATIONS

This application is a continuation of co-pending U.S. patent application Ser. No. 15/249,076 entitled AIRCRAFT HAND CONTROLLER WITH DECOUPLED THROTTLE filed Aug. 26, 2016 which is incorporated herein by reference for all purposes

BACKGROUND OF THE INVENTION

An aircraft may require a pilot to navigate the aircraft in several degrees of freedom. An aircraft controller that is complex or non-intuitive may result in poor navigation by a pilot. An aircraft may require a pilot's legs, feet, or palms to be engaged in order to maintain secure seating on the aircraft.

BRIEF DESCRIPTION OF THE DRAWINGS

Various embodiments of the invention are disclosed in the following detailed description and the accompanying drawings.

DETAILED DESCRIPTION

Figure 1A:
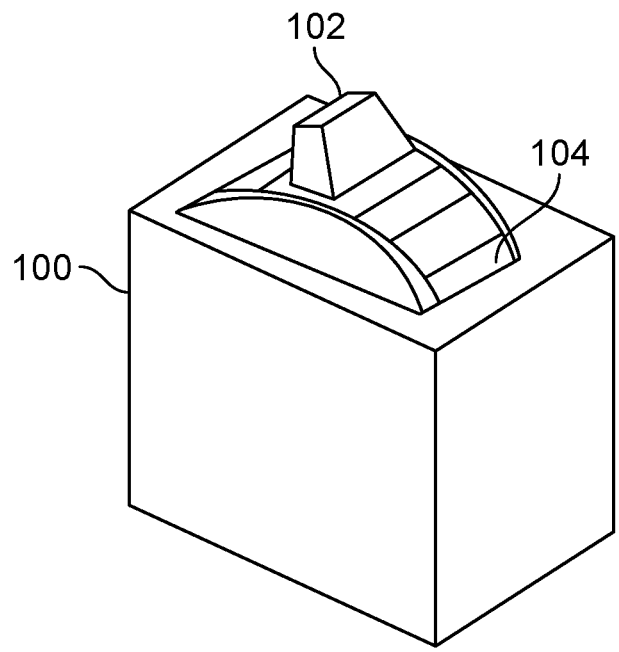
FIG. 1A is a diagram illustrating an embodiment of a wheel switch.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An aircraft hand controller is disclosed. The aircraft hand controller comprises a set of finger controls. The set of finger controls includes one or more thumb controls. The set of finger controls includes a first finger control configured to control throttle of the aircraft and a second finger control, separate from the first. The second finger control is configured to control rotation about a first rotational axis of the aircraft. The first finger control and the second finger control are on a same single hand grip structure.

In some embodiments, a finger control of the set of finger controls is attached to a hand grip. The hand grip may be designed to be grasped by a single hand. The aircraft hand controller may include two hand grips. The grips may be designed to be used by a pilot of an aircraft with one grip in each hand. In some embodiments, the set of finger controls are situated on the one or two grips. The first finger control configured to control throttle may be decoupled from other aircraft control signals. The first finger control configured to control throttle may be decoupled from all aircraft rotation controls. Decoupling rotation from throttle may improve precision or ease of flight for a pilot of an aircraft. Having separate finger controls for rotation and throttle may enable a pilot to lean on the grips or enable various aircraft fuselage configurations.

FIG. 1A is a diagram illustrating an embodiment of a wheel switch. In some embodiments, the set of finger controls includes a wheel switch. In the example shown, wheel switch 100 includes wheel 104 that may be turned. Wheel 104 protrudes from a rectangular body of wheel switch 100. Wheel 104 may be turned using tab 102. Wheel 104 may have limits to its degree of rotation. Wheel 104 may be stopped from complete rotation by tab 102. For example, tab 102 may come in contact with a face of the body of wheel switch 100 and prevent further rotation.

The wheel switch may be sized for a human hand such that tab 102 can be easily pushed by a single finger. Signals that are desired to be decoupled may each have a designated finger control. For example, a finger control may be used to control throttle and a separate finger control may be used to control rotation about an axis. Including separate finger controls for throttle and rotation in the aircraft hand controller may decrease the chance that a pilot may accidentally increase the altitude of an aircraft when intending to rotate or accidentally rotate when intending to lower the aircraft.

In some embodiments, the set of finger controls are self-centering or center-sprung. For example, when no pressure is applied to tab 102, wheel 104 may return to a position wherein tab 102 is centered in wheel switch 100. In some embodiments, the second finger control of the aircraft hand controller is a wheel switch. Rotating wheel 104 may control the degree of rotation of an aircraft. The set of finger controls may be calibrated such that the maximum degree to which a finger control is able to be manipulated may map to the maximum allowed degree to which the aircraft can move according to the given instruction. For example, an aircraft may be programmed to roll right at a maximum of 10 degrees. Pushing a wheel switch to its maximum to the right may cause the aircraft to roll right at 10 degrees.

Figure 1B:
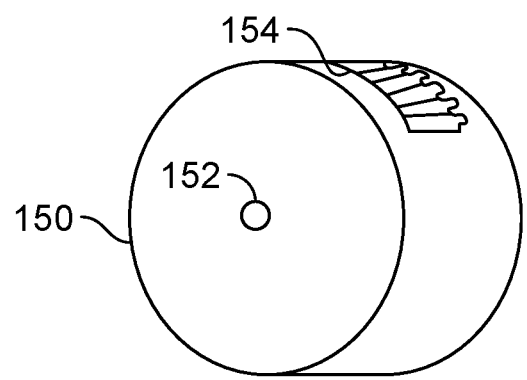
FIG. 1B is a diagram illustrating an embodiment of a wheel switch.

FIG. 1B is a diagram illustrating an embodiment of a wheel switch. In the example shown, wheel switch 150 is circular in shape. Gear 154 has ridges that allow a user to turn the gear using a finger. Gear 154 is spun around pin 152. In various embodiments, wheel switches used may be of differing sizes or design. The wheel switch may have an element that is turned and the turning of the wheel switch is translated into an instruction for the aircraft.

In some embodiments, the set of finger controls are analog controls. For example, the controls allow for a continuous range of movement. The finger controls may take as an input the degree to which they are moved. In some embodiments, the set of finger controls are digital controls. A finger control of the set of finger controls may take two distinct inputs that each cause an incremental change in the position of the aircraft. For example, a finger control may click when it is pushed either to the left or to the right. Clicking the finger control towards the left once may cause the aircraft to yaw to the left 5 degrees whereas clicking the finger control towards the left twice causes the aircraft to yaw to the left 10 degrees and clicking the finger control towards the right once causes the aircraft to yaw to the right 5 degrees. Holding the finger control towards one direction may cause it to click at a steady rate. In some embodiments, holding a finger control in a position causes the finger control to change its interpretation of its inputs. For example, holding a finger control to the left after a predetermined amount of time may increase the incremental change that each click causes. After being held to the left for 3 seconds, the finger control may cause the aircraft to yaw to the left at 10 degrees per click. After 6 seconds, the aircraft may yaw at 15 degrees per click. The rate of clicking may increase as the finger control is held in one direction continuously. In some embodiments, the set of finger controls control a rate of change. For example, the degree to which a wheel switch is rotated may determine a rate of yaw.

Figure 2A:
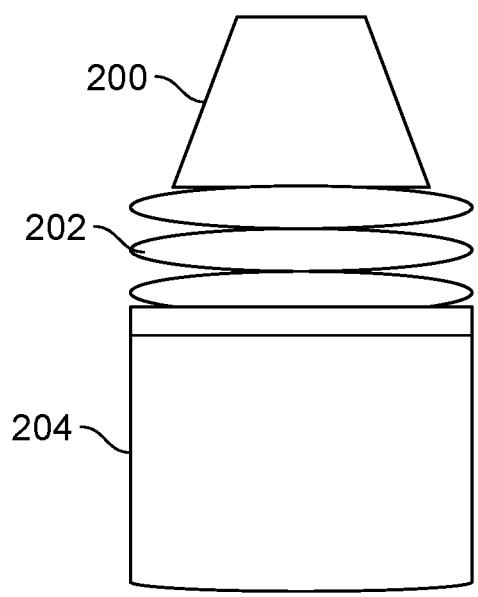
FIG. 2A is a diagram illustrating an embodiment of a joystick.

FIG. 2A is a diagram illustrating an embodiment of a joystick. In some embodiments, the set of finger controls includes a joystick. In the example shown, joystick 204 includes spring portion 202 and cap portion 200. Cap portion 200 may be sized to be manipulated with a single finger. Spring portion 202 may allow cap portion 202 to be manipulated in various directions. In some embodiments, cap portion 200 moves in directions that map to changes in an aircraft's movement. For example, cap portion 200 may have the ability to move left and right in the event joystick 204 is used to roll the aircraft left and right. The mobility of cap portion 200 may be restricted in order to provide an intuitive experience for a pilot of the aircraft.

In some embodiments, the first finger control is a joystick. The first finger control may be a thumb joystick, wherein the joystick is sized and positioned such that it is intended for use by a thumb. In some embodiments, joystick 204 is attached at the end of a grip. Spring 202 may be attached to a grip that is itself attached to a frame of the aircraft.

Figure 2B:
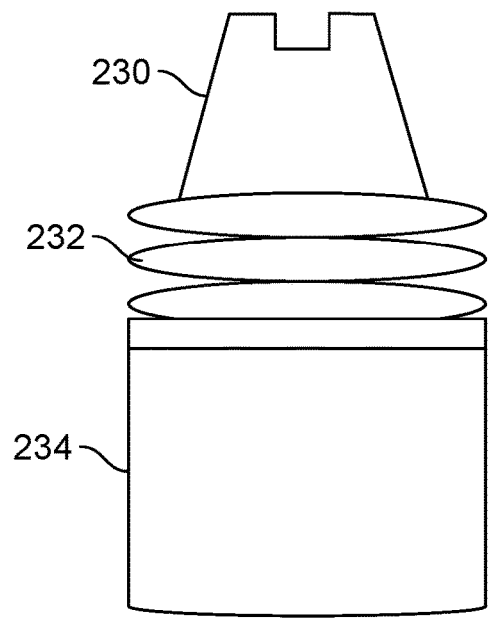
FIG. 2B is a diagram illustrating an embodiment of a joystick.

FIG. 2B is a diagram illustrating an embodiment of a joystick. In the example shown, joystick 234 includes spring portion 232 and cap portion 230. In the example shown, cap portion 230 has two visible protrusions. In some embodiments, the cap portion of the joystick is shaped to guide a pilot's actions, provide information on how the cap portion is able to be manipulated or is meant to be manipulated, or be ergonomic. Cap portion 230 may have two protrusions on opposing sides on the cap portion to signify the cap portion can be moved in two directions, for example to the left and to the right.

Figure 2C:
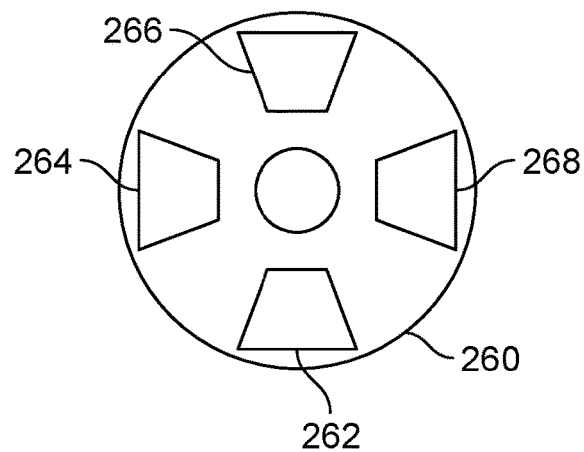
FIG. 2C is a diagram illustrating an embodiment of a joystick.

FIG. 2C is a diagram illustrating an embodiment of a joystick. A top face of a joystick is shown. In the example shown, joystick 260 includes protrusions 266, 264, 268, and 262. In some embodiments, the cap portion has four protrusions at four ends of the top face that map to four cardinal directions in which the aircraft can be moved. For example, joystick 260 may be used to control both pitch and roll. Pitching or rolling the aircraft in a direction may cause the aircraft to travel in the same direction. Joystick 260 may comprise a third finger control of the aircraft hand controller configured to pitch the aircraft forward, pitch the aircraft back, roll the aircraft left, or roll the aircraft right.

In the event signals may be combined or coupled without a negative impact on a pilot's accuracy or ease of navigation, a single finger control may be used for the multiple signals. A single finger control such as the third finger control may control multiple degrees of freedom of the aircraft. A pilot may be able to intuitively or easily accustom to control pitch and roll using a same finger control. Combinations of pitch and roll may be common in flight of an aircraft. For example, a pilot may desire to fly the aircraft to a location that is forward and to the right. The pilot may push joystick 260 in a diagonal direction to achieve the desired movement. The third finger control may be separate from the first finger control and the second finger control.

In various embodiments, various finger controls are used. The various finger controls may convey a range of movement that has a maximum and a minimum. For example, a finger control may comprise a loop that is pulled or a button that can be compressed to different levels. A finger control may comprise a control that is able to be manipulated by a finger. In some embodiments, the set of finger controls are positioned on the aircraft hand controller such that a pilot's palms are not required to shift position in order to the reach a finger control. A pilot may be able to access all finger controls in the set of finger controls by moving fingers only. In various embodiments, the set of finger controls are mounted on a grips, steering mechanisms, aircraft, tools, or any appropriate surface.

Figure 3A:
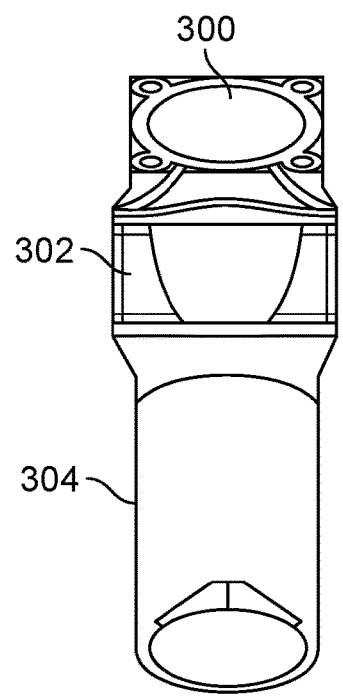
FIG. 3A is a diagram illustrating an embodiment of an aircraft hand controller with decoupled throttle.

FIG. 3A is a diagram illustrating an embodiment of an aircraft hand controller with decoupled throttle. The example shows grip 304 with spaces allotted for two finger controls. In some embodiments, the first finger control configured to control throttle and the second finger control configured to control rotation are situated on a same grip. The first finger control may be a joystick. Opening 300 of the grip shown is circular and occurs at an end of grip 304. Opening 300 may be designed for a joystick to be attached. The second finger control may be configured to control yaw, the twisting of the aircraft about a vertical axis. The second finger control may be a wheel switch. Opening 302 may be designed for a wheel switch to be inserted. In some embodiments, the second finger control is a joystick or another type of finger control. The second finger control may be situated at an end of a grip facing away from a pilot. Opening 302 may be situated such that a pilot's finger wraps around grip 304 to reach a wheel switch inserted in opening 302.

Figure 3B:
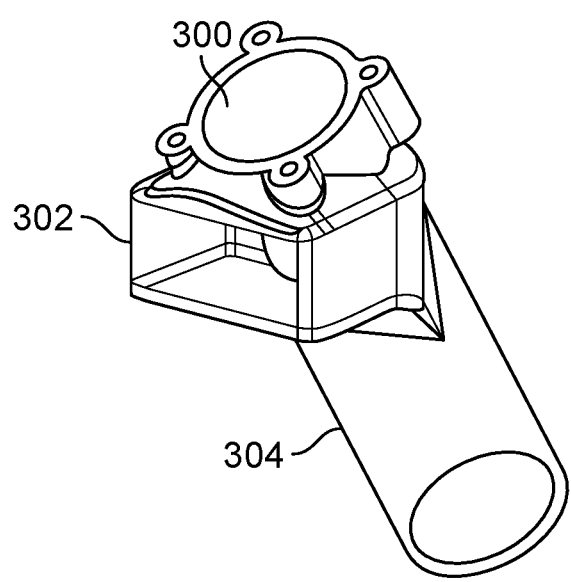
FIG. 3B is a diagram illustrating a rotated view of an embodiment of an aircraft hand controller with decoupled throttle.

FIG. 3B is a diagram illustrating a rotated view of an embodiment of an aircraft hand controller with decoupled throttle. A joystick may be attached at opening 300. A joystick type attached may depend on an intended use. For example, a joystick that has a cap portion with forward and back mobility may be used in the event the joystick is used to control throttle. Pushing the joystick forward may increase throttle and cause the aircraft to fly higher whereas pushing the joystick downwards may decrease throttle and lower the aircraft. The joystick may be intended to be used by a thumb. Opening 302 as shown protrudes from grip 304 and is rectangular in shape. Opening 302 may be designed for a wheel switch to be inserted. The wheel switch may be used to control yaw, wherein moving the wheel side to side rotates the aircraft. In some embodiments, wires connect finger controls attached at openings 300 and 302 to a flight computer of the aircraft. In some embodiments, wiring travels through a hollow in grip 304.

In some embodiments, the aircraft hand controller is designed for a pilot to position a thumb on a joystick attached at opening 300, position an index finger on a wheel switch attached at opening 302, and grasp grip 304 with a palm and three remaining fingers. In some embodiments, finger controls attached at openings 300 and 302 are each able to be manipulated using one finger. Finger controls of the controller may be able to be manipulated while a pilot maintains a same palm position or without causing a pilot to lose a firm grasp of grip 304.

Figure 3C:
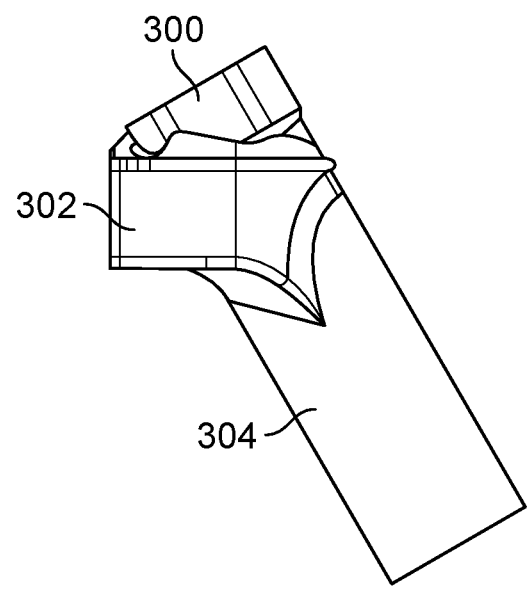
FIG. 3C is a diagram illustrating a side view of an embodiment of an aircraft hand controller with decoupled throttle.

FIG. 3C is a diagram illustrating a side view of an embodiment of an aircraft hand controller with decoupled throttle. In the example shown, opening 300 occurs at the top of grip 304. Opening 302 protrudes at an angle from grip 304 near opening 300. In some embodiments, a location or position of a finger control of the set of finger controls is adjustable. The set of finger controls may be adjustable in order to accommodate pilot comfort or various hand sizes. For example, the controller may be adjustable such that the angle at which opening 302 occurs can be changed. In some embodiments, a position of a finger control may be adjusted and secured such that the finger control does not change position during flight or by accident.

Figure 4A:
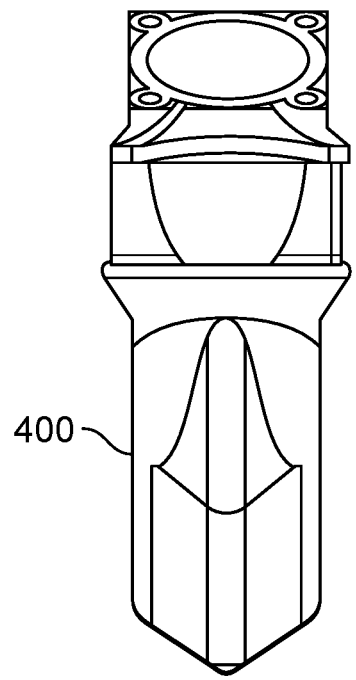
FIG. 4A is a diagram illustrating an embodiment of an aircraft hand controller with decoupled throttle.

FIG. 4A is a diagram illustrating an embodiment of an aircraft hand controller with decoupled throttle. In some embodiments, the aircraft hand controller is composed of a grip and finger control components that are inserted in or attached to the grip. In some embodiments, the grip is manufactured using a 3D printer. The grip may be designed to fit a pilot's hand. In the example shown, grip 400 narrows on the side at which a rectangular opening is located. In some embodiments, the grip is shaped in order to improve a pilot's grasp of the grip.

Figure 4B:
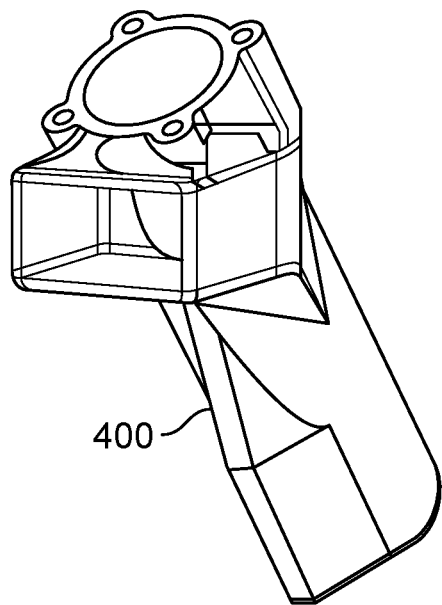
FIG. 4B is a diagram illustrating a rotated view of an embodiment of an aircraft hand controller with decoupled throttle.

FIG. 4B is a diagram illustrating a rotated view of an embodiment of an aircraft hand controller with decoupled throttle. In the example shown, grip 400 has a main body that is not cylindrical in shape. In some embodiments, the main body of the grip has a number of indentations equal to a number of fingers intended to holding the grip. In some embodiments, grip 400 comprises padding for a pilot's comfort.

Figure 4C:
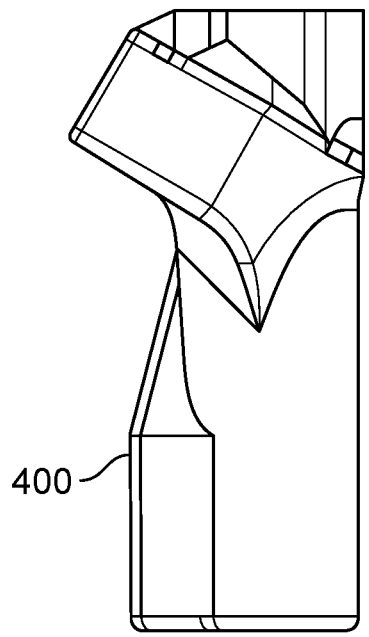
FIG. 4C is a diagram illustrating a side view of an embodiment of an aircraft hand controller with decoupled throttle.

FIG. 4C is a diagram illustrating a side view of an embodiment of an aircraft hand controller with decoupled throttle. In some embodiments, grip 400 is a single piece for ease of assembly. In some embodiments, grip 400 has adjustable opening sizes and is able to accommodate varying finger control sizes (e.g. different specifications of wheel switches). In some embodiments, grip 400 is made of a strong or weight-bearing material.

Figure 5:
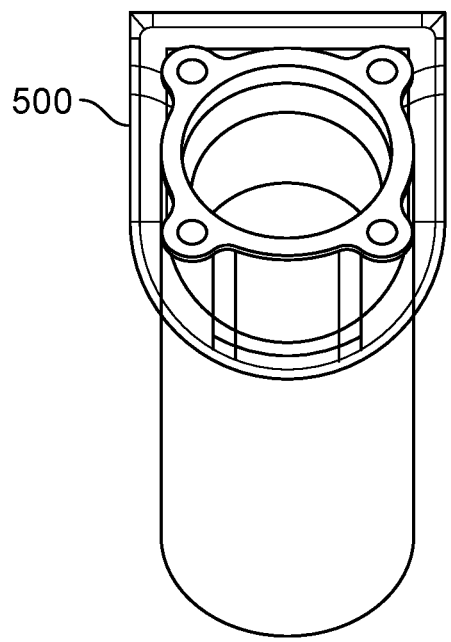
FIG. 5 is a diagram illustrating an embodiment of an aircraft hand controller.

FIG. 5 is a diagram illustrating an embodiment of an aircraft hand controller. In some embodiments, a grip of an aircraft hand controller is shown. Grip 500 has a circular opening at one end. A joystick may be attached at the circular end. In some embodiments, a joystick attached to grip 500 is used to control pitch and roll.

Figure 6:
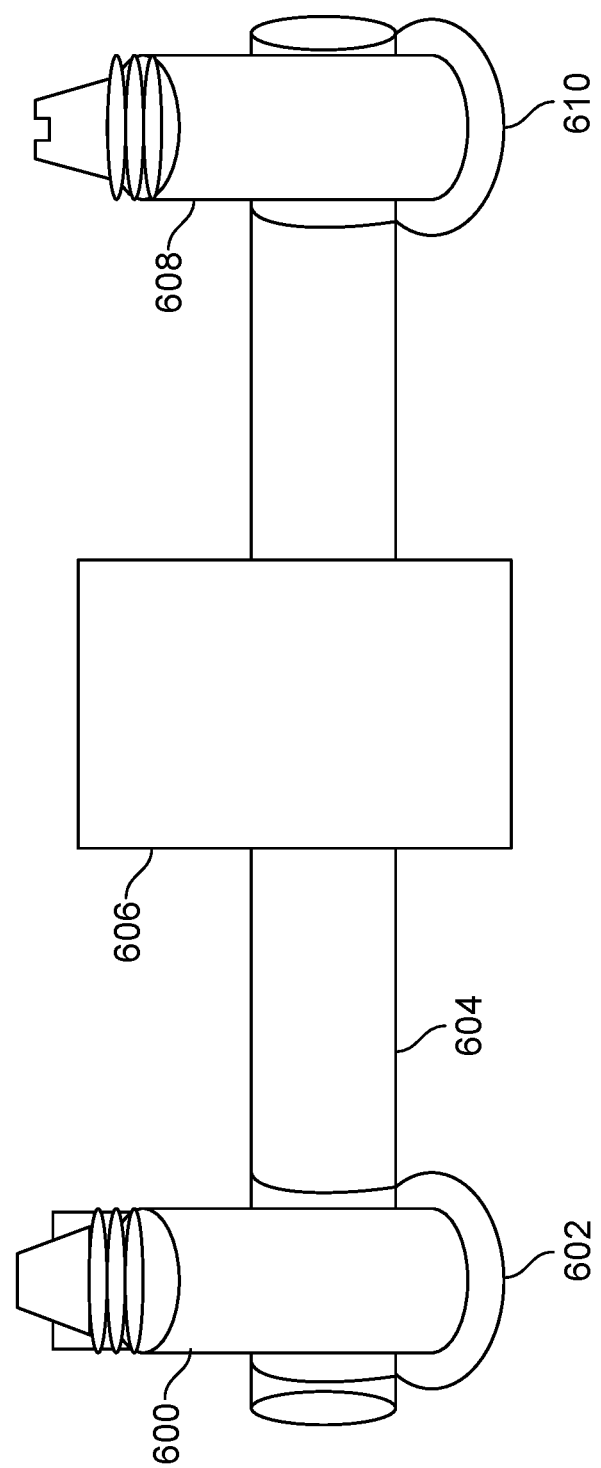
FIG. 6 is a diagram illustrating an embodiment an aircraft hand controller with decoupled throttle mounted on a handlebar.

FIG. 6 is a diagram illustrating an embodiment an aircraft hand controller with decoupled throttle mounted on a handlebar. In some embodiments, the aircraft hand controller comprises grip 600 and grip 608. Grip 600 may be intended for a pilot's left hand and grip 608 may be intended for a pilot's right hand. Grip 600 may comprise the grip shown in FIG. 3A. Grip 600 may be outfitted with wheel switch 100 of FIG. 1 and joystick 204 of FIG. 2A. Grip 608 may comprise grip 500 of FIG. 5. Grip 608 may be outfitted with joystick 234 of FIG. 2B. In the example shown, grips 600 and 608 are attached to handlebar 604. In various embodiments, grips 600 and 608 are attached to a handlebar via an adhesive, external connecting components, interlocking parts, screws, or any other appropriate method. In the example shown, component 602 attaches grip 600 to handlebar 604. Component 610 attaches grip 608 to handlebar 604. In the example shown, components 602 and 610 constitute rings surrounding each end of handlebar 604 that are connected to rings surrounded the base of grips 600 and 608.

Flight computer 606 is attached to handlebars 604. In some embodiments, finger controls such as joysticks and wheel switches are wired to flight computer 606. In some embodiments, flight computer 606 translates signals received from finger controls attached to grips 600 and 608 and causes the aircraft to change position based on the signals received from the finger controls. Flight computer 606 may comprise a display. In some embodiments, the display shows a metric of the aircraft's path. For example, the display may show the degree and direction at which the aircraft is pitched. The display may show a battery level of the aircraft, warning messages, or any appropriate information.

In various embodiments, finger controls for pitch, roll, yaw, and throttle may be placed in various positions using various types of finger controls. In some embodiments, finger controls for pitch, roll, yaw, and throttle may be combined in various combinations wherein a signal for throttle is decoupled from signals for pitch, roll, or yaw. Throttle when coupled with other signals may be easily accidentally engaged. Coupled throttle may cause a danger to a pilot or aircraft. Providing more power or less power to the aircraft than intended may cause the aircraft to fall or crash. In some embodiments, throttle is the least augmented or auto-controlled degree of freedom of the aircraft. Throttle may require special attention from a pilot. For example, the pilot may be required to constantly control the throttle. In some embodiments yaw, pitch, and roll controls of the aircraft have a zero set point. The aircraft may stop yawing, pitching, or rolling in the event that a pilot lets go of the respective controls. Throttle may not be accurately automated to maintain an aircraft's altitude without a pilot input.

Figure 7:
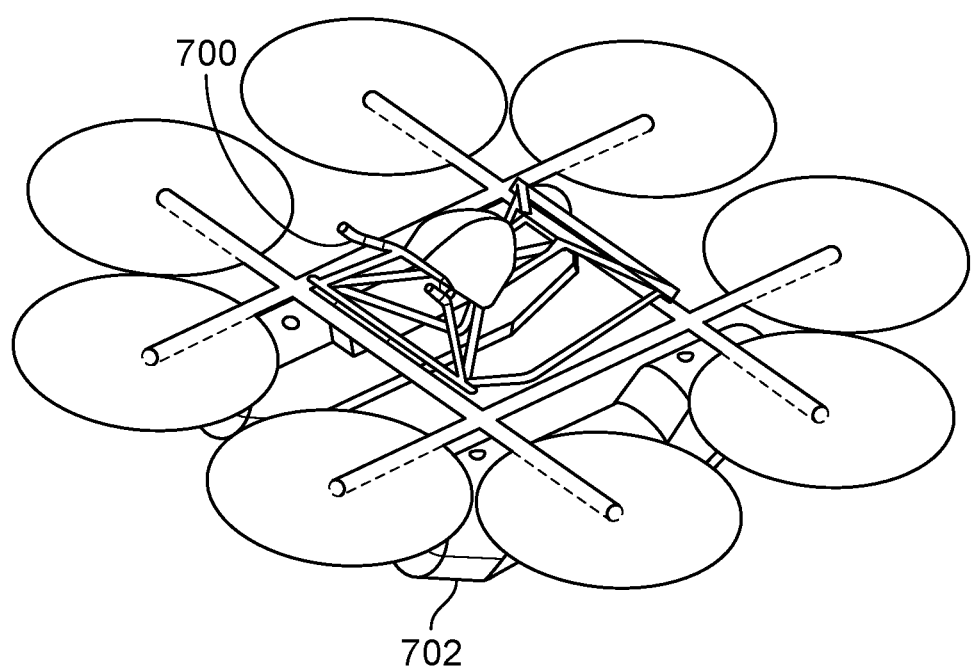
FIG. 7 is a diagram illustrating an embodiment an aircraft hand controller with decoupled throttle mounted on an aircraft.

FIG. 7 is a diagram illustrating an embodiment an aircraft hand controller with decoupled throttle mounted on an aircraft. In the example shown, multicopter 702 has eight rotors situated around a fuselage. The fuselage comprises a seat that is mounted on a frame of the multicopter and steering mechanism 700. In some embodiments, the set of finger controls are situated on grips that are rigidly mounted. For example, the grips shown may be rigidly mounted to a handlebar such that the grips do not rotate or move. The set of finger controls may be positioned on a handlebar mounted rigidly to an aircraft.

The combination of finger controls and a rigidly mounted structure may be ideal for multicopter 702, wherein a pilot must lean on the hand grips during flight. The pilot may be required to lean on or shift body weight to the hand grips. Using finger controls may allow the pilot to navigate while maintaining a firm grasp on the aircraft. A pilot's palms may remain in a static position on the grips. Using finger controls in lieu of foot pedals may allow a pilot to maintain secure footing and seating. The fuselage may be designed to be held on to in between a pilot's knees. In some embodiments, the grips may be able to withstand a weight of up to 200 pounds. The grips or handlebar may be able to withstand an expected weight of a pilot. The aircraft hand controller may be load-bearing. Steering mechanism 700 as shown includes two hand grips that are angled away from the seat. The two hand grips are attached to a handlebar that is secured to a frame of the fuselage.

In some embodiments, multicopter 702 is designed to be flown over water. The aircraft hand controller may be water resistant or waterproof as appropriate for intended conditions.

Figure 8:
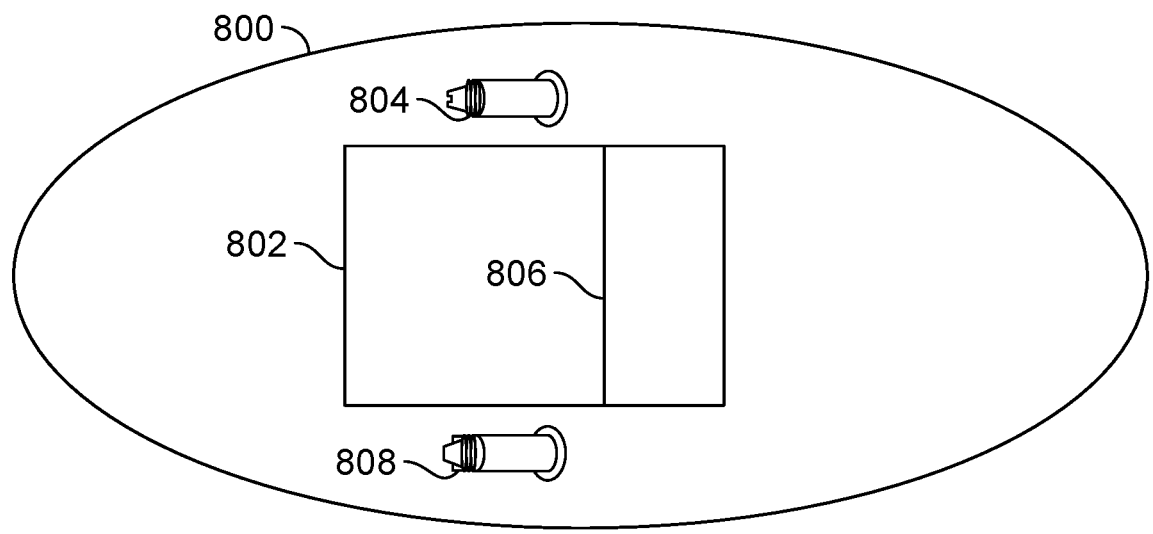
FIG. 8 is a diagram illustrating an embodiment an aircraft hand controller with decoupled throttle mounted on an aircraft.

FIG. 8 is a diagram illustrating an embodiment of an aircraft hand controller with decoupled throttle mounted on an aircraft. In some embodiments, the set of finger controls are positioned on either side of a recumbent seat of an aircraft. In some embodiments, fuselage 800 is enclosed. A pilot may sit in seat 802 and lean on back rest 806. The aircraft hand controller comprises left hand control 808 and right hand control 804. The controls may be mounted in the fuselage at an angle. The controls' design and position may be intended for a seated pilot whose hands are positioned on either side of the pilot's body near the hips or thighs. In some embodiments, left hand control 808 comprises a wheel switch and a joystick. Left hand control 808 may comprise a finger control for throttle and a separate finger control for yaw. Right hand control 804 may comprise a joystick. Right hand control 804 may comprise a single finger control that controls pitch and roll.

Figure 9:
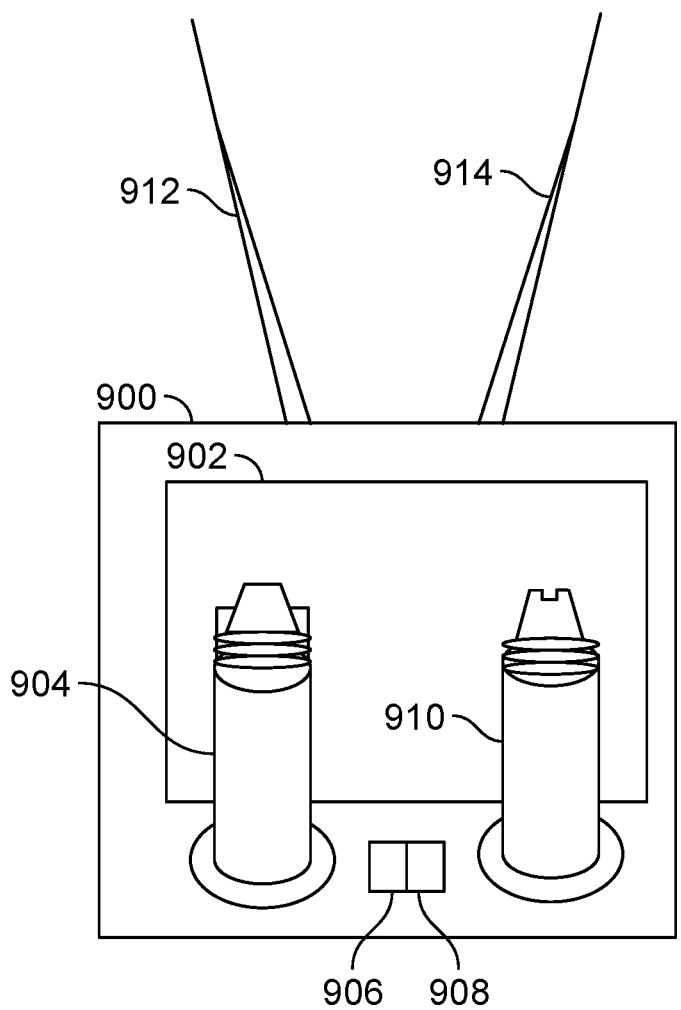
FIG. 9 is a diagram illustrating an embodiment an aircraft hand controller with decoupled throttle mounted on a remote controller.

FIG. 9 is a diagram illustrating an embodiment an aircraft hand controller with decoupled throttle mounted on a remote controller. In some embodiments, the aircraft hand controller comprises control 904 and control 910. In the example shown, the controller is a part of remote controller 900. Remote controller 900 includes display 902. Remote controller 900 may be used to navigate an aircraft. Antennas 912 and 914 may transmit signals to the aircraft. Buttons 906 and 908 may turn the remote controller on or off, calibrate the controls, change the display, or perform any appropriate function. In various embodiments, the aircraft hand controller is mounted on an aircraft, a remote control, a computer, or any appropriate surface.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft hand controller, comprising:
a hand grip body having two opposite ends; and
a set of finger controls on the hand grip body, the set of finger controls including:
a first finger control configured to control throttle of an aircraft, wherein the first finger control is mounted at one end of the hand grip body and an opposite end of the hand grip body is configured to be rigidly mounted to an aircraft, and
a second finger control, separate from the first finger control, configured to control rotation about a first rotational axis of the aircraft, wherein the second finger control is mounted on a side of the hand grip body configured to face away from a pilot and the first finger control configured to control throttle is decoupled from one or more aircraft rotation controls.

2. The aircraft hand controller of claim 1, wherein the second finger control is configured to control yaw.

3. The aircraft hand controller of claim 1, wherein the first finger control is a joystick mounted at the top of the hand grip body.

4. The aircraft hand controller of claim 1, wherein the first finger control is designed to be manipulated by a thumb.

5. The aircraft hand controller of claim 1, wherein the second finger control is a wheel switch.

6. The aircraft hand controller of claim 1, wherein the first finger control is designed to be manipulated by an index finger.

7. The aircraft hand controller of claim 1, wherein the second finger control is situated near the top of the hand grip body on a side facing away from a pilot.

8. The aircraft hand controller of claim 1, wherein the set of finger controls are self-centering.

9. The aircraft hand controller of claim 1, wherein a location or position of a finger control of the set of finger controls on the hand grip body is adjustable.

10. The aircraft hand controller of claim 1, wherein the set of finger controls are situated on a hand grip body that is rigidly mounted to the aircraft.

11. The aircraft hand controller of claim 1, wherein the set of finger controls are situated on a hand grip body that is configured to bear a load of up to 200 pounds.

12. The aircraft hand controller of claim 1, wherein the hand grip body is positioned on a handlebar mounted to an aircraft.

13. The aircraft hand controller of claim 1, wherein the hand grip body is positioned on a handlebar mounted rigidly to an aircraft.

14. The aircraft hand controller of claim 1, wherein the hand grip body is positioned on a side of a recumbent seat of an aircraft.

15. The aircraft hand controller of claim 1, comprising a third finger control separate from the first finger control and the second finger control, wherein the third finger control is configured to control rotation about a second rotational axis of the aircraft.

16. The aircraft hand controller of claim 15, wherein the third finger control controls multiple degrees of freedom of the aircraft.

17. The aircraft hand controller of claim 15, wherein the third finger control is configured to pitch the aircraft forward, pitch the aircraft back, roll the aircraft left, or roll the aircraft right.

18. The aircraft hand controller of claim 1, wherein the hand grip body is a first single hand grip body of the aircraft hand controller and the aircraft hand controller comprises a second single hand grip body.

19. The aircraft hand controller of claim 18, comprising a third finger control separate from the first finger control and the second finger control, wherein the third finger control is configured to control rotation about a second rotational axis of the aircraft, wherein the third finger control is on the second single hand grip body.

20. The aircraft hand controller of claim 19, wherein the third finger control comprises a joystick mounted at the top of the second single hand grip body.

* * * * *

UNITED STATES PATENT AND TRADEMARK OFFICE
CERTIFICATE OF CORRECTION

PATENT NO. : 10,967,952 B2
APPLICATION NO. : 16/379570
DATED : April 6, 2021
INVENTOR(S) : Joseph Roop It is certified that error appears in the above-identified patent and that said Letters Patent is hereby corrected as shown below:

In the Specification

In Column 6, Line(s) 6, delete "holding" and insert --hold--, therefor.

Signed and Sealed this
Twenty-eighth Day of June, 2022

Katherine Kelly Vidal
*Director of the United States Patent and Trademark Office*